THOMAS C. BALL.
Improvement in Clothes Pins.
No. 125,253.  Patented April 2, 1872.
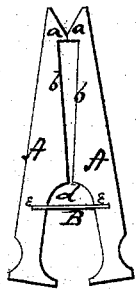

125,253

UNITED STATES PATENT OFFICE.

THOMAS C. BALL, OF BELLOW'S FALLS, VERMONT.

IMPROVEMENT IN CLOTHES-PINS.

Specification forming part of Letters Patent No. 125,253, dated April 2, 1872.

SPECIFICATION.

*To all whom it may concern:*

Be it known that I, THOMAS C. BALL, of Bellow's Falls, in the county of Windham and State of Vermont, have invented certain new and useful Improvements in Clothes-Pins; and I do hereby declare that the following is a full, clear, and exact description thereof, reference being had to the accompanying drawing and to the letters of reference marked thereon which form a part of this specification.

The nature of my invention consists in the construction and arrangement of a "clothes-pin," as will be hereinafter more fully set forth.

In order to enable others skilled in the art to which my invention appertains to make and use the same, I will now proceed to describe its construction and operation, referring to the annexed drawing, which represents a side view of my clothes-pin.

My clothes-pin, or clamp, as it may be called, is formed of two parts, A A, constructed exactly alike, and connected by means of a steel spring, B. The two parts or jaws A A are constructed at one end with hooks $a\ a$, beveled on their inner sides, as shown, so that by pressing the hooks down upon the line they will separate without the necessity of pressing inward on the other ends of the jaws, these ends being, however, formed in a suitable manner, as shown, so as to be readily pressed upon by two fingers. From the hooks $a\ a$ the inner sides $b\ b$ of the jaws are inclined up to the throat $d$ of the pin. The spring B is fastened in the jaws A A by webbing the ends of the spring, thereby forming a dovetail when driven in, and thus fastening the spring, as shown at $e\ e$. When the pin is on the line the spring forces the hooks $a\ a$ inward, and said hooks prevent it from getting off from the line.

Having thus fully described my invention, what I claim as new, and desire to secure by Letters Patent, is—

The jaws A A, constructed as described, with hooks $a\ a$, inclines $b\ b$, and throat $d$, and connected together by the straight spring B, substantially in the manner and for the purposes herein set forth.

In testimony that I claim the foregoing as my own I affix my signature in presence of two witnesses.

THOS. C. BALL.

Witnesses:
 J. D. BRIDGMAN,
 WALTER TAYLOR.